G. L. KELLEY.
GUIDE DEVICE FOR WOODWORKING OR ROUTING MACHINES.
APPLICATION FILED JAN. 13, 1908. RENEWED MAR. 1, 1912.
1,042,120.
Patented Oct. 22, 1912.
2 SHEETS—SHEET 1.
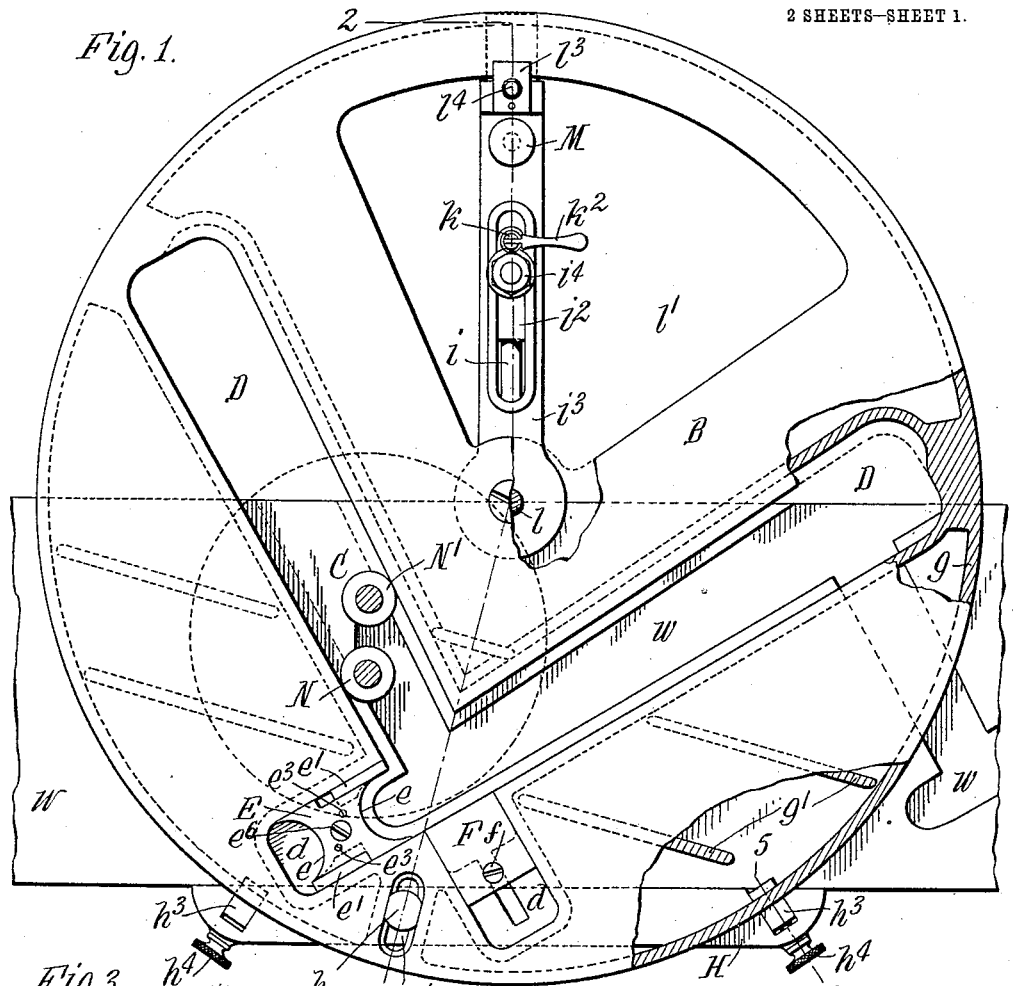
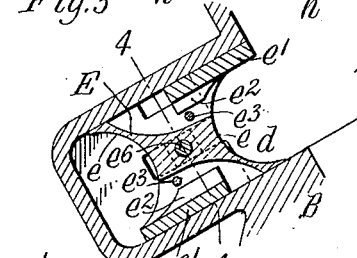
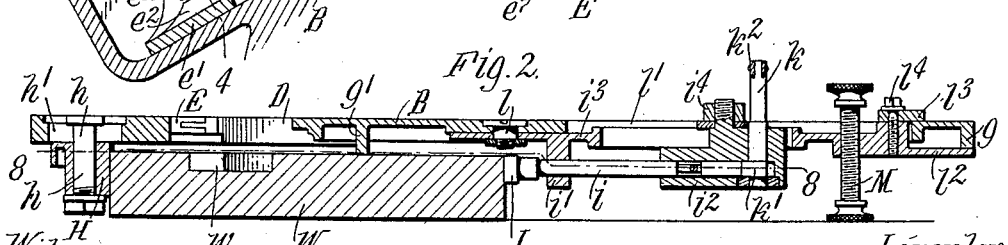
Witnesses:
A. L. McGee.
A. S. Dimond.
Inventor.
George L. Kelley
By W. J. Kelley, Burke & Hood
Attorneys.

G. L. KELLEY.
GUIDE DEVICE FOR WOODWORKING OR ROUTING MACHINES.
APPLICATION FILED JAN. 13, 1908. RENEWED MAR. 1, 1912.

1,042,120.

Patented Oct. 22, 1912.
2 SHEETS—SHEET 2.

Witnesses:
A. L. McKee.
A. B. Dimond

Inventor.
George L. Kelley
By Wilhelm, Parker & Hard
Attorneys.

UNITED STATES PATENT OFFICE.

GEORGE L. KELLEY, OF BUFFALO, NEW YORK, ASSIGNOR, BY MESNE ASSIGNMENTS, TO KELLEY ELECTRIC MACHINE COMPANY, OF BUFFALO, NEW YORK, A CORPORATION.

GUIDE DEVICE FOR WOODWORKING OR ROUTING MACHINES.

1,042,120.  Specification of Letters Patent.  Patented Oct. 22, 1912.

Application filed January 13, 1908, Serial No. 410,474. Renewed March 1, 1912. Serial No. 680,810.

*To all whom it may concern:*

Be it known that I, GEORGE L. KELLEY, a citizen of the United States, residing at Buffalo, in the county of Erie and State of New York, have invented a new and useful Improvement in Guide Devices for Woodworking or Routing Machines, of which the following is a specification.

This invention relates more particularly to improvements in portable wood-working or routing machines of the type disclosed in my U. S. Letters Patent No. 877,894, granted January 28, 1908. These machines are used principally for cutting grooves or depressions in the surface of material, and have one or more driven cutters, and a guide or pattern device is provided upon which the machine rests and is moved about. The guide device has a suitable opening or openings through which the cutter or cutters extend to enter the work, and guide faces which coöperate with guide rollers or parts on the machine to direct the cutters and define the shape of the cut. The invention is directed to improvements in the guiding means.

The objects of the invention are to provide a portable guide device or pattern plate for such machines of simple, light, and compact construction and having means capable of quick and easy operation for adjustably securing it in the required position on the work to properly locate the pattern; also to provide a pattern for cutting the riser and tread seats in stair stringers, which can be easily adjusted for cutting seats of different dimensions and angularity in right and left stringers; also to provide interchangeable nosing guides for cutting tread nosings of different shapes and sizes; also to provide the machine with guide rollers adapted to be readily secured in different positions for making cuts of different widths.

Figure 6:
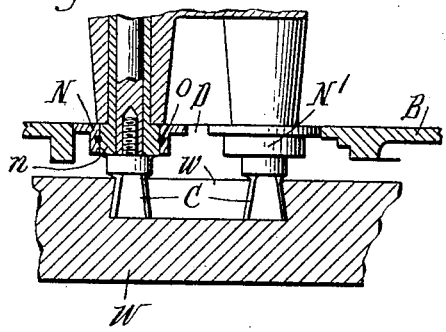
Figure 7:
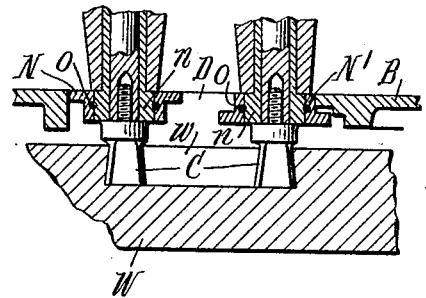
Figure 8:
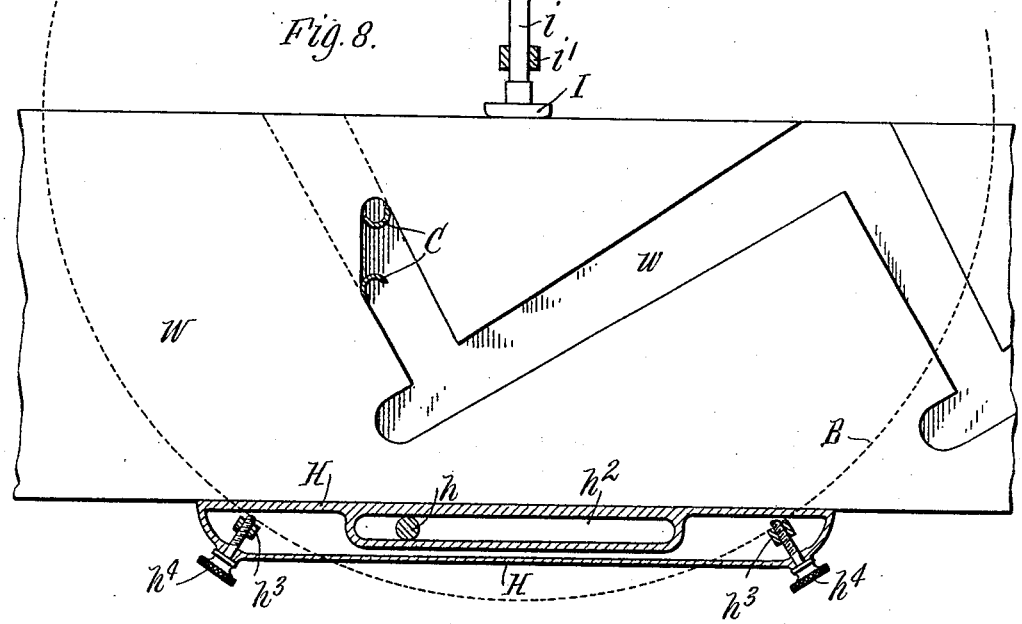
Figure 9:
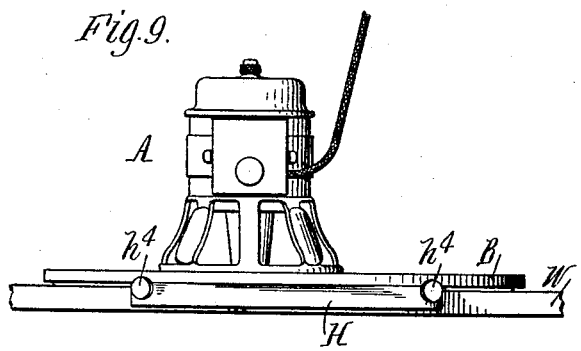
Figure 10:
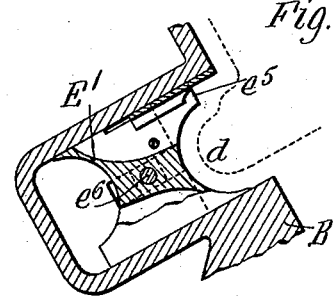

In the accompanying drawings, consisting of two sheets: Figure 1 is a plan view, partly in section, of a guide device or pattern plate secured in place upon a stair stringer. Fig. 2 is a sectional elevation thereof in line 2—2, Fig. 1. Fig. 3 is a sectional plan, on an enlarged scale, of a nosing guide and a portion of the pattern plate. Fig. 4 is a cross section thereof in line 4—4, Fig. 3. Fig. 5 is a section, in line 5—5, Fig. 1, showing one of the end securing devices for the clamp bar. Fig. 6 is a sectional elevation, on an enlarged scale, of the cutters and portions of the pattern plate and work. Fig. 7 is a section of the same parts, showing a different arrangement of the guide rollers for the cutters. Fig. 8 is a sectional plan of the clamp for the guide device and the work, in line 8—8, Fig. 2. Fig. 9 is an elevation, on a reduced scale, of the routing machine and guide device. Fig. 10 is a sectional plan, similar to Fig. 3, of a nosing guide for a different shaped nosing.

Like letters of reference refer to like parts in the several figures.

A, Fig. 9, represents the routing machine and B the supporting and guide device or pattern plate therefor. The pattern plate is secured over the work or wood to be cut and the machine rests upon and is adapted to be moved about on the unobstructed top surface of the pattern plate with its cutter or cutters, shown at C, Figs. 6 and 7, extending down through an opening D in the pattern plate to enter or engage the work. The shape and arrangement of the opening D in the pattern plate will depend upon the work for which it is designed. The pattern plate shown in the drawings is for use in cutting the riser and tread seats in stair stringers, and the opening D is of right-angular form, its inner guide edge being inclined with reference to its outer guide edge to produce the usual tapering or wedge-shaped seats or grooves $w$ in the stringer W. The seat for the stair tread ordinarily extends beyond the juncture of the riser seat therewith to receive the nosing of the tread, and to adapt the pattern plate for cutting right and left stringers, both legs of the right-angular opening D extend beyond their juncture, as shown at $d$, Fig. 1, and a nosing guide E is secured in one of these extensions and a blank guide or filling block F in the other. The nosing guide can have at one or both ends guide edges of semi-circular or other suitable form for properly shaping the nosing seat to receive the particular nosing to be used. The nosing guide E, shown in Figs. 1, 3 and 4, has a semi-circular guide edge $e$ at each end and is provided in a recess at one side of each end with an adjustable slide $e'$ adapted to project from the semi-circular edge of the nosing guide to the guide edge of the riser leg of the guide opening D. The slide has a lateral rib $e^2$ entering a slot in the nosing guide to hold it in place thereon, and a screw $e^3$ passing through the slotted side of the guide serves for clamping the rib in the slot to hold the slide in adjusted positions. The slides at the opposite ends of the nosing guide are preferably of different thickness, as shown in Fig. 3, so that the one guide can be used for nosings of different diameters by using one or the other of its ends as the guide. Thus by providing one nosing guide having a semicircular guide edge of its full width at one end, and a thin slide $e'$ at the other end, and a second nosing guide with slides of different thicknesses and each thicker than that of the first guide, it is possible to cut nosings of four different diameters. The nosing guide $E'$, shown in Fig. 10, has a slide at one end only and is adapted for cutting ogee nosings of the form indicated by the dotted line in said figure for treads of two different thicknesses. The ogee cut is produced by reason of the fact that the guide forms a shoulder $e^5$ within the guide opening $d$ around which the cutter guide roller can turn before reaching the tread guide edge. The nosing guide of either form is secured in place in the opening $d$ of the pattern plate by a clamping screw $e^6$ and nut $e^7$, Fig. 4, which engage in an open-ended undercut slot in a portion of the pattern plate, forming a bottom for the opening extension $d$. The nosing guide is countersunk to receive the heads of the securing screw $e^6$ and the slide clamping screws $e^3$ so that the screw heads will not project above the top surface of the plate and interfere with the free movement of the machine thereon, and the guide has countersinks on both sides for the securing screw $e^6$ so that the guide can also be secured in the inverted position. The blank-guide or filling block F is secured in the other opening extension $d$ with one of its straight end edges forming a part of the outer straight guide edge of the tread leg of the opening D. The blank guide is secured in place by a clamping screw $f$ and nut in the same manner as the nosing guide. This blank guide can be set back in the opening extension $d$ and used as a guide for square nosings, and it can have slides like the nosing guide E for cutting square nosings of different diameters.

The nosing and blank guides are interchangeable for cutting right and left stringers, and the former can be reversed and inverted so that either guide end can be used for either a right or left stringer.

The pattern plate is preferably circular and provided with a depending peripheral flange $g$ and depending cross ribs $g'$ which rest upon the surface of the work. These flanges and ribs strengthen the plate, which is made thin to reduce its weight.

Means are provided for adjustably clamping the pattern plate on the work, preferably constructed as follows: H and I represent respectively a clamping bar and head on the bottom of the pattern plate which bear against the opposite edges of the stringer or work and between which the stringer is clamped. The clamp bar is pivoted between its ends to the pattern plate at one side thereof, by a vertical bolt $h$ extending through a radial slot $h'$ in the pattern plate and a longitudinal slot $h^2$, Fig. 8, in the clamp bar, and is provided at opposite ends with devices for securing it in adjusted positions on the pattern plate. Each of the securing devices shown, see Figs. 1 and 5, consists of a slide $h^3$ located in a slot in the clamp bar and having a hook engaging the inside of the peripheral flange $g$ of the pattern plate, and a finger screw $h^4$ for operating the slide. The clamping head I is secured to the inner end of a stem $i$ which slides lengthwise in bearings $i'$ $i^2$ depending from a radial supporting bar $i^3$. The outer bearing $i^2$ for the stem of the clamping head is adjustable lengthwise of the supporting bar in a longitudinal slot therein and is secured by suitable means, such as a nut $i^4$ working on a screw-threaded stud on the bearing and engaging the top of the supporting bar. By adjusting the bearing $i^2$ along the supporting bar the clamping head I is set nearer to or farther from the clamp bar H, as required for work of different widths. The clamping head is operated to clamp and release the work after the bearing $i^2$ is adjusted, by an upright shaft $k$, Fig. 2, journaled in the adjustable bearing $i^2$ and having an eccentric $k'$ engaging the stem of the clamping head and a pivoted handle $k^2$, Fig. 1, at its upper end. When the clamping head is once adjusted for work of one width it can be quickly operated to clamp and release the work by turning the operating shaft $k$. The supporting bar $i^3$ for the clamping head is pivoted at its inner end to the center of the pattern plate by a suitable screw or the like $l$ and bridges a sector-shaped opening $l'$ in the pattern plate. Means are provided at the outer end of the bar $i^3$ for securing it in the desired angular position, consisting, in the construction shown, of fixed and movable clamping jaws $l^2$ $l^3$, Figs. 1 and 2, which embrace the rim of the pattern plate and are caused to grip the same and firmly hold the bar by tightening up an operating screw $l^4$ for the movable clamping jaw. The pattern plate can be rotatably adjusted on the work to locate the guide opening D at the desired angle, by releasing the clamp head I and loosening the pivot bolt and securing hooks $i^3$ for the clamp bar H and the securing device at the outer end of the radial supporting bar for the clamping head. The pattern plate can then be turned about the pivot screw $l$ for the radial supporting bar to the extent necessary for positioning the guide opening D for cutting the seats in the stringer at any usual angle. In thus turning the pattern plate the clamp bar H will slide lengthwise on its pivot bolt and the latter will slide in or out in its slot in the pattern plate, thus permitting the clamp bar to swing with the work relative to the pattern plate. After the desired adjustment is secured the securing devices at the ends of the clamp bar H and outer end of the radial supporting bar $i^3$ are again tightened to hold the parts in the adjusted position. The pattern plate can then be released for moving it along the stringer to the position for cutting another seat, and again secured without altering its angular adjustment by simply operating the clamping head I by the shaft $k$.

M, Figs. 1 and 2, represents a leg or prop carried by the radial supporting bar $i^3$ and adapted to rest on the work table for supporting the overhanging part of the pattern plate. As shown, this leg is screw-threaded and works in a threaded hole in the radial support $i^3$, whereby it can be raised or lowered as required to hold the pattern plate horizontal on work of different thicknesses.

The machine illustrated is provided with two cutters, see Figs. 6 and 7, and guide rollers N N′ loosely surrounding the bearing bushings $n$ for the cutter shafts are adapted to travel on the guide edges of the opening D in the pattern plate to direct the cutters as the machine is moved over the pattern plate. The guide rollers are preferably flanged at one end so that they have guide faces of different diameters and they are reversible on the bushings. One guide edge of the opening D is made thin or undercut so that when the coöperating roller N′ is arranged with its flange up, as shown in Fig. 6, the flange will bear on the guide edge and hold the cutter farther from the same than when the roller is inverted, so that its smaller peripheral face can bear on the guide edge. Thus, while the distance between the cutters is fixed, it is possible, by placing one guide roller with its flange up or down and holding the machine so that the rollers bear against the opposite guide edges of the opening D, to vary the distance between the paths followed by the cutters and so regulate the width of the cut. Manifestly both guide edges of the pattern plate could be made thin or undercut, in which case, by placing both guide rollers with their flanges up, or by reversing one or both rollers, cuts of three different widths could be made. The rollers can be releasably secured on the bushings by any suitable means which will enable them to be readily removed, inverted and replaced. Split spring rings O located in registering annular grooves in the rollers and bushings are shown for this purpose.

The described clamping means for the pattern plate are light and take up but little space, so that the guide device as a whole is smaller, lighter and less cumbersome and can be handled with greater ease than if it had a large clamping base or frame.

While the guide device illustrated is intended for cutting stair stringers, it is obvious that the same general construction could be used regardless of the shape and arrangement of the guide openings in the pattern plate thus adapting it for other uses. The guide device is also desirable for use with universally movable routing and analogous cutters in stationary machines.

I claim as my invention:

1. A guide device for machines of the character described comprising a pattern plate, a clamp bar angularly adjustable thereon, a coöperating clamping head, an angularly adjustable support for said clamping head, and means mounted on said support for operating said clamping head to clamp and release the work, substantially as set forth.

2. A guide device for machines of the character described comprising a pattern plate, a clamp bar having a pivotal and slidable connection with said plate, means for securing said clamp bar in adjusted positions, a coöperating clamping head, a supporting bar for said clamping head which is pivoted to the center of said pattern plate to swing circumferentially thereon, means for securing said supporting bar, and means for operating said clamping head to clamp and release the work, substantially as set forth.

3. A guide device for machines of the character described comprising a pattern plate, a clamp bar angularly adjustable thereon, a coöperating clamping head, an angularly adjustable support for said clamping head, a bearing for said clamping head which is adjustable on said supporting bar, and operating means for said clamping head mounted on said adjustable bearing, substantially as set forth.

4. A pattern plate for stair stringers provided with an angular opening having extensions beyond the angle, and interchangeable guide blocks of different forms placed in said opening extensions, substantially as set forth.

5. A pattern plate for stair stringers provided with an angular opening having extensions beyond the angle, and a guide block in one of said opening extensions having an end guide edge, and a slide at one side of said guide edge which is adjustable to project beyond said guide edge, substantially as set forth.

6. A pattern plate for stair stringers provided with an angular opening having extensions beyond the angle, and an invertible nosing guide adapted to be placed in either of said opening extensions, and means for securing said guide in one of said opening extensions and in inverted position in said other opening extension, substantially as set forth.

7. A pattern plate for stair stringers provided with an angular opening having extensions beyond the angle, and an invertible and reversible nosing guide having different end guide edges and adapted to be placed in either of said opening extensions with either guide edge in position for use, and means for securing said nosing guide in position, substantially as set forth.

8. A pattern plate for stair stringers provided with an angular guide opening having an extension beyond the angle, and a reversible nosing guide for said opening extension having guide edges at opposite ends, and adjustable slides at opposite ends for co-operating with said guide edges in cutting nosing seats of different dimensions, substantially as set forth.

Witness my hand, this sixth day of January, 1908.

GEORGE L. KELLEY.

Witnesses:
C. W. Parker,
C. B. Hornbeck.

Copies of this patent may be obtained for five cents each, by addressing the "Commissioner of Patents, Washington, D. C."